July 21, 1925.  
W. S. YOUNG  
SAFETY PIN  
Filed Nov. 19, 1923

1,546,697

Patented July 21, 1925.

1,546,697

UNITED STATES PATENT OFFICE.

WILLIAM STEELE YOUNG, OF LONDON, ENGLAND.

SAFETY PIN.

Application filed November 19, 1923. Serial No. 675,489.

*To all whom it may concern:*

Be it known that I, WILLIAM STEELE YOUNG, a subject of the King of Great Britain and Ireland, residing at 45 Melody Road, East Hill, Wandsworth, London, S. W. 18, England, late of 28 Henderson Road, Wandsworth Common, London, S. W. 18, England, have invented Improvements in or Relating to Safety Pins, of which the following is a specification.

This invention relates to safety pins and has for its object to provide locking means whereby the points of ordinary safety pins are prevented from becoming unsafe by accidental removal from the guard.

A locking device according to the present invention consists in a sheet metal sheath which is substantially of the shape of and fits slidably and by frictional contact on the usual laterally slotted sheet metal guard shield of an ordinary safety pin, so that by sliding adjustment of the said shield the lateral slot or slots in the guard shield may be covered or uncovered. An inward projection in the form of a dimple or dent in the side or sides of the locking sheath is adapted to engage the existing slot or slots in the sides of the guard shield and thereby to limit the outward movement of the locking sheath.

The accompanying drawings show the construction of a safety pin, embodying the invention.

Figure 1:
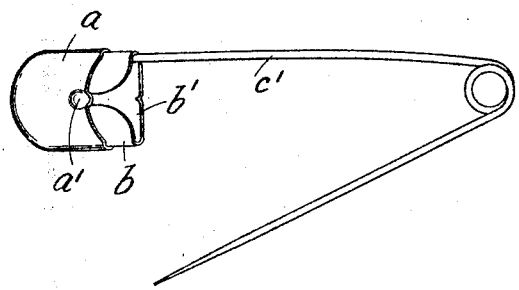
Figure 2:
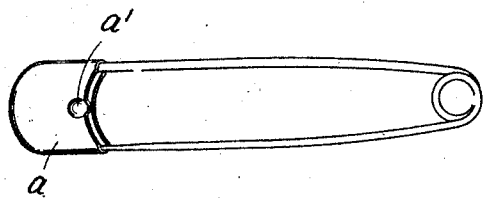
Figure 3:
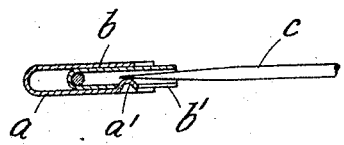

Fig. 1 shows the safety pin open, and Fig. 2 shows the same in the closed position; while Fig. 3 is a section through the locking device.

A thin metal sleeve $a$ is adapted to slide upon the guard $b$ or socket arranged at one end of an ordinary safety pin $c$, fitting the said guard $b$ with frictional contact, sufficient to retain it in its adjusted position. When such sleeve $a$ is pushed inwardly (Fig. 2) it covers the lateral slot $b^1$ of the guard $b$ and prevents the safety pin from becoming accidentally opened and exposing the pin point, while when drawn outwardly (Fig. 1) the sleeve $a$ uncovers the said slot $b^1$ and allows the pin to be operated in the usual manner.

The sleeve $a$ is preferably made in the form of a cap fitting the guard $b$, so that the closed end of the sleeve or cap limits its inward sliding movements. The outward movement is limited by a dimple or dent $a^1$ in the side of the sleeve or cap $a$ which engages the lateral slot $b^1$ of the guard.

I claim:—

A safety pin of ordinary known type, a sliding sheath fitting the guard shield of said safety pin to cover or uncover with its sides the existing lateral slot or slots in said guard shield, said sheath being provided with an inward projection or projections engaging the existing slot in the guard shield.

WILLIAM STEELE YOUNG.

Witnesses:
JAMES C. WOOLSTONE,
EDWARD CHAPMAN.